March 29, 1966  M. NOBLE  3,242,961
LOCKING DEVICE
Filed April 9, 1963  2 Sheets-Sheet 1
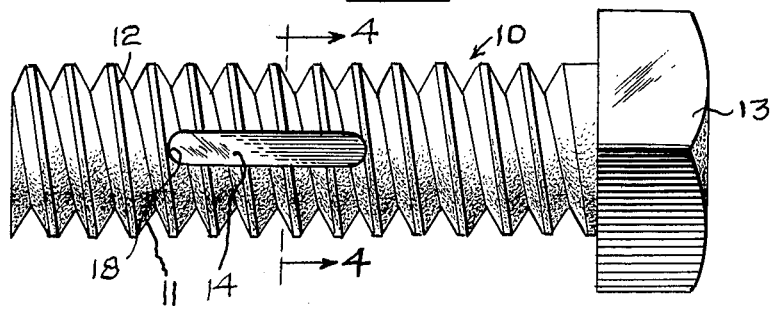
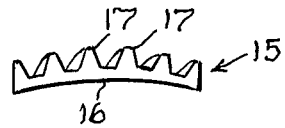
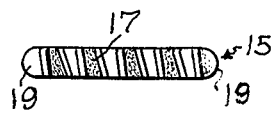
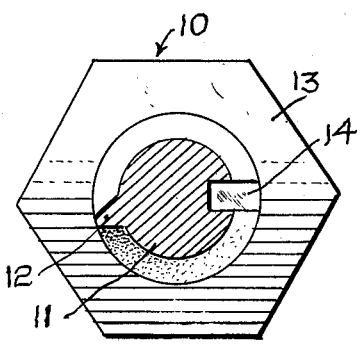
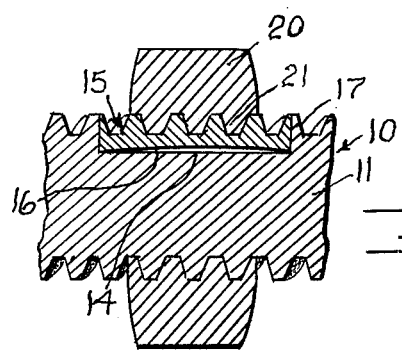
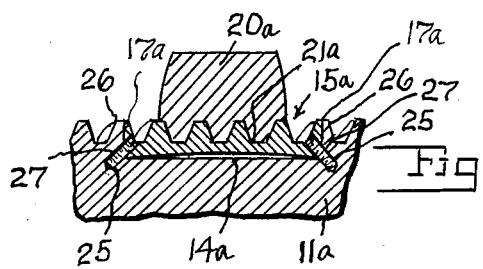
INVENTOR
Mark Noble
BY John B. Dickman III
AGENT March 29, 1966
M. NOBLE
3,242,961
LOCKING DEVICE
Filed April 9, 1963
2 Sheets-Sheet 2
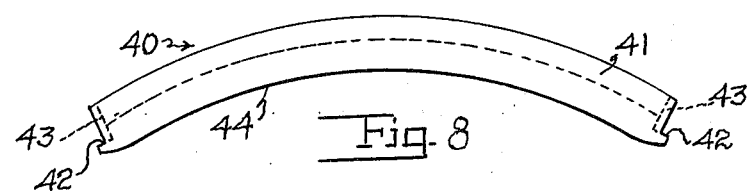
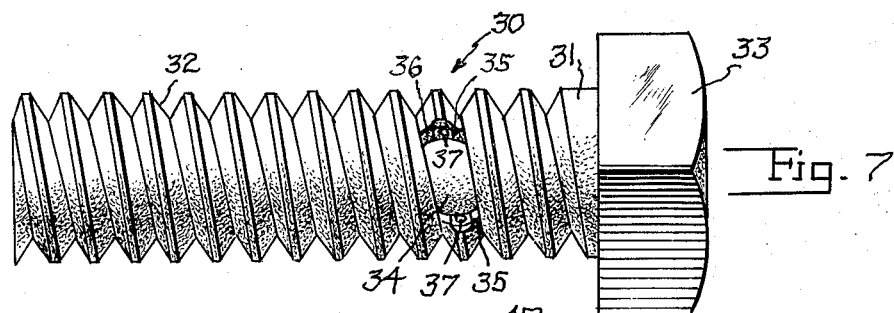
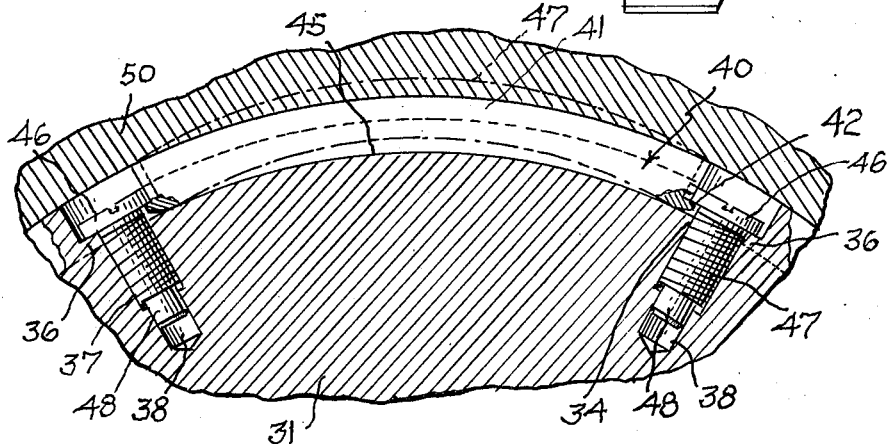
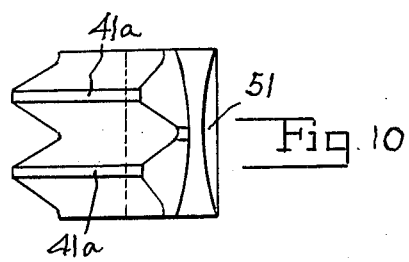
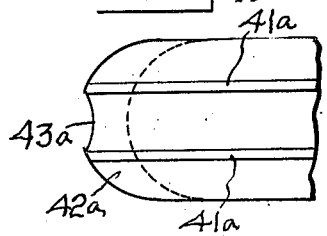
INVENTOR
*Mark Noble*
BY *John B. Dickman III*
AGENT United States Patent Office 3,242,961
Patented Mar. 29, 1966

3,242,961
LOCKING DEVICE
Mark Noble, Portsmouth, N.H., assignor to Space Research Corporation, Elmira, N.Y., a corporation of New York
Filed Apr. 9, 1963, Ser. No. 271,619
2 Claims. (Cl. 151—14)

This invention relates to a locking device, and more particularly to a locking device for a threaded article such as a bolt, screw, stud, or the like, adapted to be engaged by a correspondingly oppositely threaded nut.

A primary object of this invention is the provision of an improved lock of this character which may be formed integrally with the shank of the threaded article, and is comprised of an expansible resilient member which, when the device is engaged by the nut, will conform to the internal threaded configuration thereof, but which will, through its own inherent resiliency, bow outward after engagement to retain the parts against inadvertent disassembly.

A further object of the invention is the provision of a device of this character which comprises an insert which may be positioned in a recess extending longitudinally of the bolt shank and wherein the threads of the insert extend transversely of the longitudinal axis of the bolt and conform in configuration to the threads of the bolt.

An additional object of the invention is the provision of a similar insert which may be inserted in the transverse recess partially encircling the bolt shank and having a thread configuration extending parallel to the longitudinal axis of the insert, and transverse angularly in accordance with the pitch of the threads relative to the longitudinal axis of the shank.

A further object of the invention is the provision of improved means for retaining such an insert in position in its associated recess in its initial outwardly bowed or expanded shape, contraction being effected by engagement with an associated nut, and the inherent resiliency of the insert in attempting to regain its natural shape affording a relatively tight lock against the adjacent inner surface of the nut.

A further object of the invention is the provision of a locking device of this character which is sturdy and durable in construction, reliable and efficient in operation, and relatively simple and inexpensive to manufacture and utilize.

Other objects reside in the combinations of elements, arrangements of parts, and features of construction, all as will be more fully pointed out hereinafter and disclosed in the accompanying drawings wherein there are shown preferred embodiments of this inventive concept.

In the drawings:

FIGURE 1 is a side elevational view of one form of screw provided with a recess for the reception of one form of locking device in accordance with the instant invention.

FIG. 2 is a side elevational view of the locking insert adapted to fit in the recess of FIG. 1.

FIG. 3 is a top plan view of the insert of FIG. 2.

FIG. 4 is a sectional view taken substantially along the line 4—4 of FIG. 1 as viewed in the direction indicated by the arrows.

FIG. 5 is a sectional view taken through the center line of a bolt constructed in accordance with the instant invention in locking engagement with a nut.

FIG. 6 is a view similar to FIG. 5 but showing a slightly modified form of the invention.

FIG. 7 is a view similar to FIG. 1 but showing a modified arrangement of the recess for the reception of the insert.

FIG. 8 is an enlarged side elevational view of an insert adapted to fit in the recess of FIG. 7.

FIG. 9 is an enlarged fragmentary sectional view taken through the center line of the recess of FIG. 7 showing the insert of FIG. 8 in position therein.

FIG. 10 is a fragmentary transverse sectional view of a modified form of insert adapted to encompass two adjacent threads, and, FIG. 11 is a fragmentary top plan view of the form of construction disclosed in FIG. 10.

Similar reference characters refer to similar parts throughout the several views of the drawings.

Having reference now to the drawings in detail, and more particularly to FIGS. 1 to 5 inclusive, there is generally indicated at 10 a bolt of any desired size and configuration, including a shank 11 having a helical thread 12 of any desired pitch thereon, and a head 13. A recess 14 is formed in one side of the shank, and extends completely through the threads, and a short distance therebeneath. Recess 14 may be of any desired length, and may cross as many threads as desired.

An insert is generally indicated at 15, and is dimensioned to fit snugly within the recess 14. The bottom surface of insert 15 is arcuate and bowed as at 16, while the outer surface is provided with a plurality of teeth 17 conforming in pitch, spacing, and direction, exactly to the threads 12. However, the arcuate undersurface 16 imparts resiliency to the metal of the insert 15 so that in normal usage the same is outwardly bowed. The ends of recess 14 are arcuate or curved as indicated at 18, while the ends 19 of the insert conform exactly thereto. When bolt shank 11 is screwed into a nut 20 having internal threads 21 corresponding in pitch and size to the threads 12, the arcuate undersurface 16 is compressed towards the bottom of the recess 14, but not completely in contact therewith, merely to an extent sufficient to deform the bow or arc and reduce the curvature thereof so that the inherent resiliency of the insert 15 causes material outward pressure of the teeth 17 against the teeth 21. This pressure is normally sufficient to retain bolt 10 from disengagement with nut 20 under any normal conditions, but insufficient to resist material force exerted, as by a wrench or the like when it is desired purposely to separate the component parts.

A modified form of construction is disclosed in FIG. 6 wherein an insert 15a substantially identical to the insert 15 seats in a recess 14a and a bolt shank 11a. The ends of recess 14a are provided with bores 25 which are aligned with corresponding bores 26 angularly disposed interiorly of the endmost of threads 17a on insert 15a. Headless screws 27 are passed through the aligned bores 26 and 25, and are inclined oppositely toward the ends of shank 11a. The arrangement is thus such that insert 15a is securely held in position in recess 14a, and the inherent resiliency therein is in no way affected so that, when the insert is engaged by a nut 20a, the threads 21a thereof are locked or secured in a manner identical to that of the previously described modification.

A further modified form of the invention is disclosed in FIGS. 7 to 11 inclusive. In this form of the invention a bolt or screw is generally indicated at 30, and includes a shank 31 provided with threads 32 of any desired pitch, and a head 33. A recess 34 is formed in the shank 31 in a direction substantially transverse to the longitudinal axis of shank 31 or parallel with the helix angle of the threads 32. The ends of recess 34 are arcuate as indicated at 35, and provided with shoulders 36 adjacent bores 37 having counterbores 38 at their lower extremities. The bores 37 and 38 are radial relative to the shank 31, and converge towards the center thereof.

An insert is generally indicated at 40, and comprised of resilient relatively strong metallic material. In the form of the invention disclosed in FIGS. 7, 8 and 9 the insert 40 is provided with a single thread 41 conforming in inclination to the helix of the thread 32. End flanges 42 are provided at each end of the insert, and the adjacent faces are arced out as at 43. When the insert is fitted into the associated recess 34, the bottom 44 thereof is arced to a greater extent than the corresponding bottom 45 of recess 34, and the end flanges 42 engage beneath the heads 46 of screws 47 which engage in threaded bores 37. Screws 37 are provided with end portions 48 which seat in counterbores 38 for proper alignment purposes. The edges of the heads 46 engage in the arcuate end portions 43, and serve normally to tension the insert 40 so that it is bowed outwardly to the dotted line position indicated at 47 in FIG. 9. When screw or bolt 30 is inserted in a threaded ring or nut 50 the insert 40 is flattened so that a radial thrust is exerted against the internal threads of the ring 50, this wedging resulting in a locking action between the nut and the threaded shank.

The lower surface of adapter 40 may be arcuate transversely as indicated at 51 in FIG. 5, and if desired, may have a pair of helical threads 41a, the helix conforming to the threads 32, the recess being obviously of the width of the pair of threads. The end 43a of a flange 42a corresponding to flange 42 and end 43 of the previously described modification are also adapted to conform to similar holding screws.

Any of the inserts previously described may be comprised of any desired relatively strong resilient material and the inserts may be manufactured by any desired method.

From the foregoing it will now be seen that there is herein provided an improved locking device which accomplishes all of the objects of this invention, and others, including many advantages of great practical utility and commercial importance.

As many embodiments may be made of this inventive concept, and as many modifications may be made in the embodiments hereinbefore shown and described, it is to be understood that all matter herein is to be interpreted merely as illustrative and not in a limiting sense.

I claim:
1. In combination with a threaded article having an externally helically threaded shank engageable with a correspondingly internally threaded bore in a standard second article, said shank having a recess therein, a locking insert comprised of a flat resilient relatively strong material, conforming in configuration to and fitting tightly in said recess and having an arcuate inner surface having a radius of curvature normally biasing the outer surface of the insert out of said recess, and threads on said outer surface of said insert conforming in pitch and configuration to the threads of said shank, said recess extending substantially transversely of the longitudinal axis of said shank and in parallel with the pitch of the threads of said shank, said insert being provided with at least one thread extending in parallelism with said threads and extending only a slight distance around the circumference of the shank, the ends of said insert being provided with flanges, radial bores extending into said shank from the ends of said recess, and headed screws engaging in said bores with their heads overlying said flanges, whereby upon threading said shank and insert into said threaded bore said insert exerts a radial thrust against the inner surface of said bore locking said articles against inadvertent disengagement.

2. The structure of claim 1 wherein the ends of said insert are concaved to conform to the curvature of said screws.

References Cited by the Examiner

UNITED STATES PATENTS

| 447,697 | 3/1891 | Pollard | 151—7 |
| 1,020,026 | 3/1912 | Clark | 151—23 |
| 1,083,463 | 1/1914 | Prejean | 151—23 |
| 2,263,223 | 11/1941 | Protin | 151—25 |
| 2,367,213 | 1/1945 | Harding | 151—14 |
| 2,654,410 | 10/1953 | Proctor | 151—25 |
| 3,091,271 | 5/1963 | Samiran | 151—25 |
| 3,149,654 | 9/1964 | Podell | 151—23 |

EDWARD C. ALLEN, *Primary Examiner.*